United States Patent [19]

Papuchon et al.

[11] Patent Number: 4,732,444
[45] Date of Patent: Mar. 22, 1988

[54] INTEGRATED OPTICS DEVICE FOR OPTICAL POLARIZATION CONVERSION

[75] Inventors: Michel Papuchon, Issy les Moulineaux; Catherine Mariller, Gif sur Yvette, both of France

[73] Assignee: Thomson-CSF, Paris, France

[21] Appl. No.: 843,265

[22] Filed: Mar. 24, 1986

[30] Foreign Application Priority Data

Mar. 26, 1985 [FR] France ........................ 85 04490

[51] Int. Cl.$^4$ .............................................. G02B 6/12
[52] U.S. Cl. ............................ 350/96.14; 350/96.13
[58] Field of Search ............... 350/96.12, 96.13, 96.14

[56] References Cited

U.S. PATENT DOCUMENTS 4,198,115 4/1980 Kaminow ........................ 350/96.14
4,400,052 8/1983 Alferness et al. ................ 350/96.12

FOREIGN PATENT DOCUMENTS 2406219 10/1978 France .

OTHER PUBLICATIONS

Journal of Applied Physics, vol. 50, No. 4, Apr. 1979; pp. 2555-2564, American Institute of Physics, New York, U.S.; S. Yamamoto: "Guided-Radiation Mode Interaction in Off-Axis Propagation in Anisotropic Optical Waveguides with Application to Direct-Intensity Modulators: *p. 2556, col. 1, lines 24-37; figures 1, 2*.

1981 IEEE MTT-S International Microwave Symposium Digest, 1981, pp. 528-530, IEEE, New York, U.S.: S. Yamamoto: "Polarization-Rotated Radiation Conversion in Electrooptic Waveguides" *figure 3*.

IEEE Journal of Quantum Electronics, vol. QE-18, No. 4, Apr. 1982, pp. 767-771, New York, U.S.; F. Heismann, et al.: "Integrated-Optical Single-Sideband Modulator and Phase Shifter" *figure 3*.

*Primary Examiner*—Eugene R. LaRoche
*Assistant Examiner*—James C. Lee
*Attorney, Agent, or Firm*—Oblon, Fisher, Spivak, McClelland & Maier

[57] ABSTRACT

An integrated optics optical polarization conversion device comprising a guide structure formed by integrated optics in a flat substrate made from a uniaxial crystalline material having electro-optical properties in which two distinct modes may propagate. In accordance with the invention, the optical axis of the crystal of said substrate forms an angle with the plane of the substrate less than ($\pi/2$) radians. In one of the variants, said axis is parallel to the direction of propagation of the guided wave and the device comprises a single set of homogeneous electrodes.

6 Claims, 4 Drawing Figures

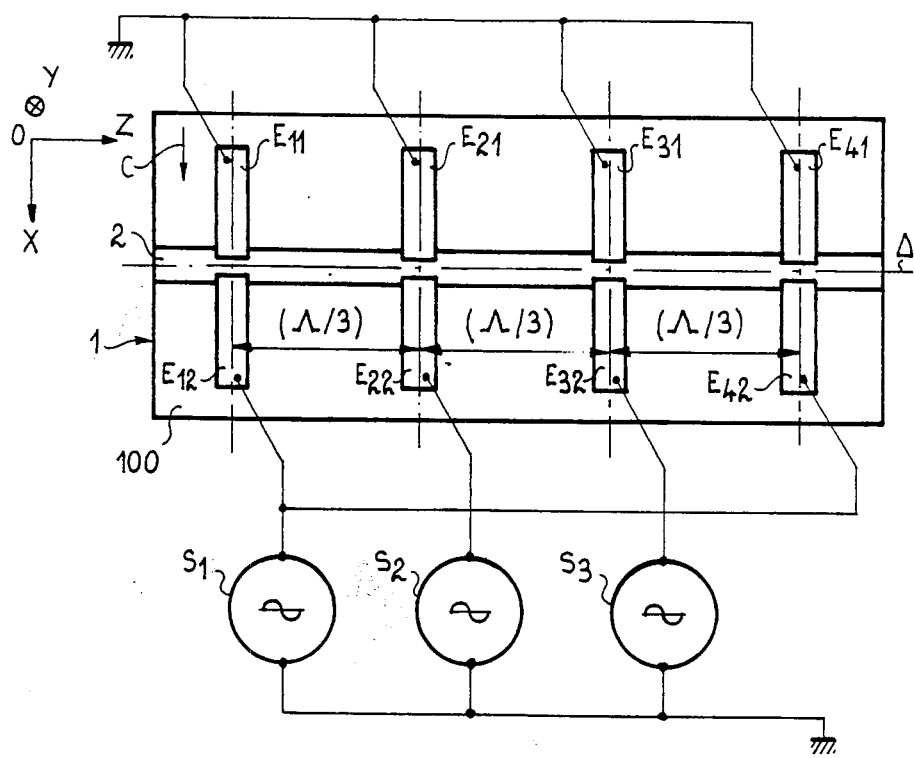
FIG_1 PRIOR ART
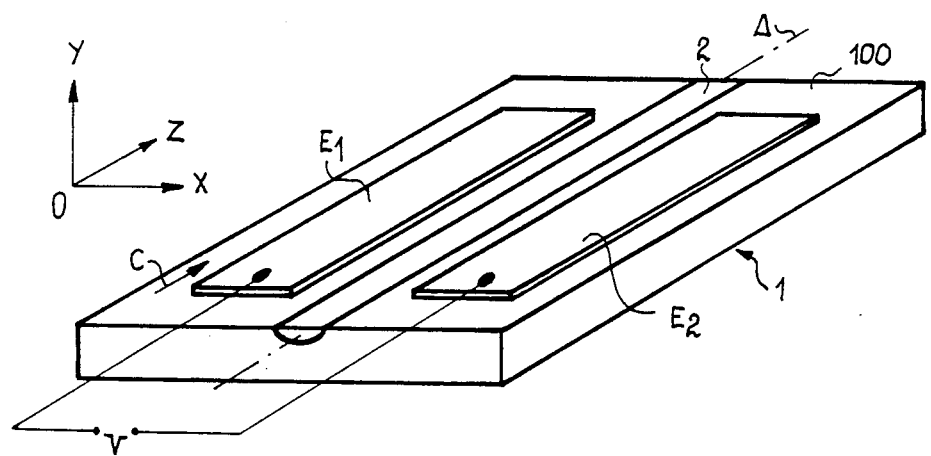
FIG_2

FIG_3
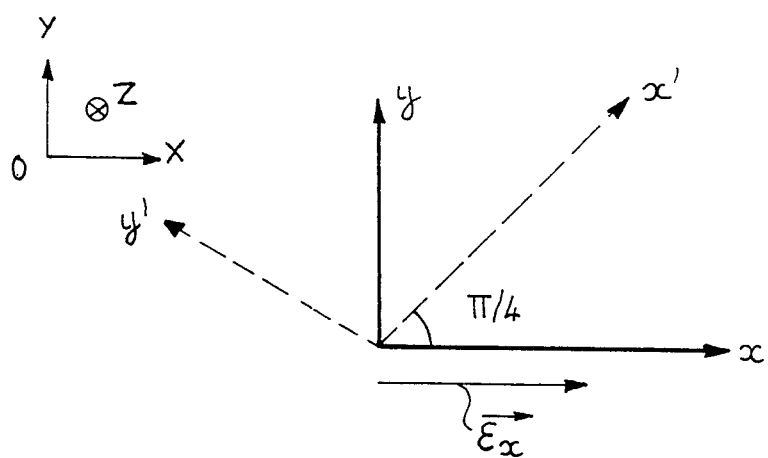
FIG_4
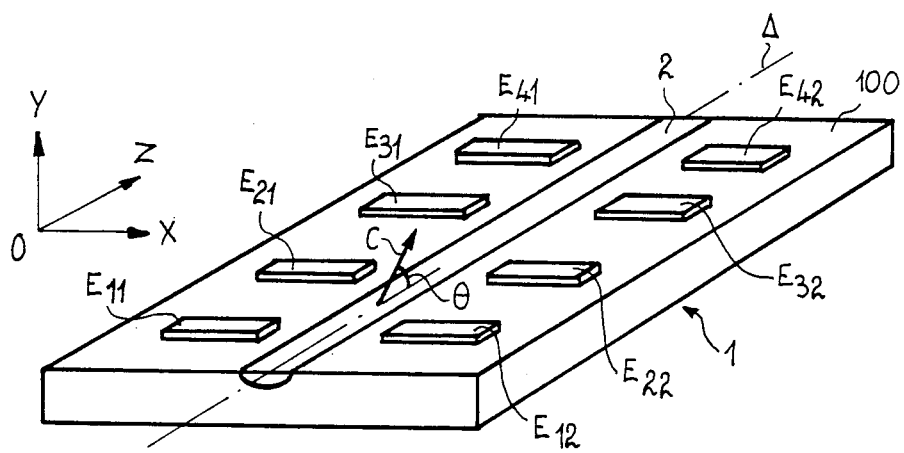

INTEGRATED OPTICS DEVICE FOR OPTICAL POLARIZATION CONVERSION

BACKGROUND OF THE INVENTION

The invention relates to an optical polarization converter device of the integrated optics structure type, in particular a wide band converter.

The device finds its application in numerous fields in which polarization controllers are required for forming amplitude modulators, circuits whose operation is independent of the incident polarization, etc.

It is known, in a guide structure allowing propagation of two separate guided modes, that an exchange of energy between the two modes may be achieved.

A guide structure coming into this category may be either a truly bimodal structure or a structure comprising two monomode guides formed on a common substrate, very close to one another, and between which the energy exchanges may take place if certain conditions are provided.

It is also known that the two modes are characterized by their propagation constants, called $\beta_{M1}$ and $\beta_{M2}$ in what follows.

If an energy exchange between the two modes is to be provided, it is necessary to create a disturbance introducing coupling between the two modes.

The two modes are, for example, the transverse electric TE and transverse magnetic TM modes.

The prior art circuits comprise a substrate whose orientation is such that the intrinsic birefringents between the TE/TM modes requires a periodic interaction. In fact, when a coupler is formed, i.e. a converter between two modes $M_1$ and $M_2$, in order to obtain an efficient interaction it is necessary for the so called "phase concord" condition to be achieved.

In general, the propagation constants $\beta M_1$ and $\beta M_2$ of the two modes are different and, in order to confirm this condition, it is necessary to have recourse to an interaction of the periodic type obeying the relationship:

$$\beta_{M1} - \beta_{M2} = (2\pi/\lambda) \tag{1}$$

in which relationship $\lambda$ is said period.

The region in which the coupling takes place behaves then like a coupling "network". This "network" may be either stationary or moving.

The periodicity of the artificial "network" thus created compensates therefore for the birefringence between the two modes $M_1$ and $M_2$.

It is clear that the greater $\beta_{M1}$ is different from $\beta_{M2}$, the smaller will be the period $\lambda$ required for phase concord. In the prior art configurations, the light propagation is perpendicular to the optical axis C of the crystal. The period $\lambda$ is of the order of 10 $\mu$m for waves situated in the near infrared. Since the interaction lengths required are of the order of a centimeter, the number of periods is therefore high, of the order of $10^3$, which means that the circuits obtained have a very narrow optical band. The ratio $\Delta\lambda/\lambda$ is of the order of $10^{-3}$. This results in constructional difficulties if it is desired to obtain operation at a well defined wave length. These difficulties are for example due to the effects of temperature on the optical constants of the materials, to the variations of the wave length of the sources used and to the difficulty of obtaining sufficient manufacturing information.

The aim of the invention is to overcome the disadvantages of the prior art by providing a converter with very wide optical band.

In an additional advantageous variant of the device of the invention, the band width may be predetermined accurately at the manufacturing stage.

SUMMARY OF THE INVENTION

The invention provides then an integrated optics device for optical polarization conversion comprising a flat substrate made from a uniaxial crystalline material having electro-optical properties and a guide structure with given optical axis formed by doping the material of the substrate and in which at least two separate modes may propagate, wherein the optical axis of the crystalline material forms an angle with the plane of the substrate less than $(\pi/2)$ radians.

BRIEF DESCRIPTION OF THE DRAWINGS

The invention will be better understood and other features and advantages will be clear from reading the following description with reference to the accompanying Figures in which:

FIG. 1 is an example of the device of the prior art,

FIG. 2 is a device according to a first embodiment of the invention,

FIG. 3 is a diagram explanatory of the physical phenomena brought into play, and FIG. 4 is a device according to a second variant of the invention.

FIG. 1 illustrates schematically an example of a converter device of the prior art.

DETAILED DESCRIPTION OF THE INVENTION

It comprises first of all a flat substrate 1. It will be assumed hereafter that it is a substrate made from crystal, such as lithium niobate, a material which is very often used for its excellent optical and electro-optical qualities. Other crystals may be used such as lithium tantalate and, more generally, uniaxial crystals in which their exists an electro-optical coefficient allowing coupling between two propagation modes to be created.

At the surface of this substrate, on the upper face 100 in the example illustrated, a guide structure 2 is created, for example using a process for the thermal diffusion of metal ions. This allows a band of a few micrometers in thickness and in width to be formed extending, in the example illustrated, in a direction parallel to a given axis, conventionally the axis Z of an orthonormed trihedron OXZY. Face 100 is parallel to the plane XOZ.

In order that region 2 may form a wave guide, it must have a refraction index higher than that of the substrate, naturally for the wave length of the light to be guided. The optical axis $\Delta$ of the wave guide is parallel to the axis Z.

The crystal forming substrate 1 has an optical axis which will be designated hereafter by the reference C.

This axis C, in the prior art devices, is chosen orthogonal to the mean propagation direction of the guided light, that is to say to axis $\Delta$ or else to axis Z of the orthonormed reference trihedron, as illustrated in FIG. 1.

For providing the so called "phase concord" condition, it is necessary to have recourse to periodic type interaction so that the above mentioned relationship (1) is verified.

For this, several methods may be used. In a recent method, the device is provided with electrodes disposed along the wave guide and fed by sinusoidal voltage sources phase shifted with respect to each other. Such an arrangement is illustrated in FIG. 1 and is described in a French patent application No. 84 04102 filed on the 16 Mar. 1984.

The electrodes are disposed on each side of the optical axis $\Delta$, this axis forming the axis of symmetry for the set of electrodes. They are preferably thin rectangular plates whose largest dimension is orthogonal to the axis.

In FIG. 1 four pairs of electrodes have been shown: $E_{11}$-$E_{12}$ to $E_{41}$-$E_{42}$.

If a potential difference is applied between two electrodes of a pair, there is created between these electrodes an electric field of intensity and direction imposed by the amplitude and the sign of the potential difference applied. The electrodes are fed with a sinusoidal voltage signal, the potential difference and the electric field created naturally follow the same law.

The distances separating the electrode pairs $E_{11}$-$E_{12}$ to $E_{41}$-$E_{42}$ have been called $d_1$ to $d_3$. The physical phenomenon of which use is made within the scope of the invention may be explained in the following way:

If the following relationship is confirmed:

$$d_1 = d_2 = d_3 = (\lambda/3) \tag{2}$$

in which relationship $\lambda = 2\pi/(\beta_{M1} - \beta_{M2})$, at the points considered a sinusidal coupling wave is sampled which is propagated in the structure.

The propagating sinusoidal wave is described by the relationship:

$$\sin(\omega t - (2\pi/\lambda)z) \tag{3}$$

in which z is the distance travelled along the axis $\Delta$ and $\omega$ the pulsation.

The relative phases of the sinusoidal wave from one set of electrodes to the other are written:

between ($E_{21}$-$E_{22}$) and ($E_{11}$-$E_{12}$): $2\pi d_1/\lambda = 2\pi/3$ (4)

between ($E_{31}$-$E_{32}$) and ($E_{11}$-$E_{12}$): $4\pi/3$ (5)

between ($E_{41}$-$E_{42}$) and ($E_{11}$-$E_{12}$): $2\pi$ (6)

The propagation of this wave may therefore be reproduced artificially, that is to say synthesized by feeding the electrode pairs with the electric signals described by the following relationships:

between electrodes $E_{11}$ and $E_{12}$: $V \sin \omega t$ (7)

between electrodes $E_{21}$ and $E_{22}$: $V \sin(\omega t \pm 2\pi/3)$ (8)

between electrodes $E_{31}$ and $E_{32}$: $V \sin(\omega t \pm 4\pi/3)$ (9)

between electrodes $E_{41}$ and $E_{42}$: $V \sin \omega t$ (10)

in which relationships V represents the maximum amplitude of the potential difference applied between the electrodes.

Through the electric field which is developed between the electrode pairs, a wave is thus created which propagates in the same direction as the guided wave or in the opposite direction depending on the sign of the phase shifts ($2\pi/3$) and ($4\pi/3$).

By an electro-optical effect this phenomenon induces a wave of equivalent index or, in other words, a "coupling point" wave. A moving coupling "network" is thus created.

The interaction of this wave with the guided wave behaves like a travelling wave intermode coupling.

To generate the above mentioned sinusoidal voltages, voltage sources are used connected to the electrodes as described hereafter.

The electrodes $E_{11}$, $E_{21}$, $E_{31}$ and $E_{41}$ are connected together and are connected to the ground potential. Electrodes $E_{12}$ and $E_{42}$ are connected to a first terminal of a source $S_1$ delivering the signal: $V \sin \omega t$ (relationship (7) and (10)), electrode $E_{22}$ is connected to a first terminal of a source $S_2$ delivering the signal: $V \sin(\omega t + 2\pi/3)$ (relationship (8)) and electrode $E_{32}$ is connected to a first terminal of a source $S_3$ delivering the signal: $V \sin(\omega t + 4\pi/3)$ (relationship (9)). Typically, the value of the maximum amplitude V is of the order of 10 V.

The second terminals of these sources $S_1$ to $S_3$ are connected to ground, i.e. to electrodes $E_{11}$ to $E_{41}$.

In order to obtain propagation in the opposite direction, as was mentioned, it is sufficient to reverse the phases of the signals generated by sources $S_2$ and $S_3$: respectively ($2\pi/3$) and ($4\pi/3$).

The number of electrode pairs is of course not limited to four, in actual fact it is greater. The coupling efficiency increases moreover with the number of electrode pairs. Similarly, the number of separate phases may also be increased. If the number of phases increases, the coupling efficiency increases for the synthesis of the wave created is then of better quality.

The most general formula describing the phase shift is:

$$(K(2\pi/n)) \tag{11}$$

n being the number of different phases and K the rank of the electrode pair from zero; n and k being whole numbers.

The periodicity of the artificial network thus created therefore compensates for the birefringence between the two propagation modes.

It is clear that the greater $\beta_{M1}$ is different from $\beta_{M2}$, the smaller will be the period $\lambda$ required for phase concord. In the configurations usually used, $\lambda$ is of the order of 10 micrometeres for waves situated in the near infrared. Since the interaction lengths required are of the order of a centimeter, the number of periods is then very high of the order of $10^3$, which means that the circuits obtained have a very narrow optical band. The ratio $\Delta\lambda/\lambda$ is typically of the order of $10^{-3}$. This often results in constructional difficulties if it is desired to obtain operation at a well defined wave length. These difficulties are due for example to the effects of temperature on the optical constants of the materials, to the variations of the wave length of the sources used and to the difficulty of obtaining sufficient manufacturing information.

The invention overcomes these drawbacks.

For this, according to the main feature of the invention, the crystal of the substrate is formed so that its optical axis C is no longer in a plane orthogonal to the propagation direction, that is to say is no longer orthogonal to the axes $\Delta$ and z (FIG. 1).

FIG. 2 illustrates a first variant of the device of the invention. The elements common with those of FIG. 1 bear the same references and will not be described again.

In this variant, the optical axis C is chosen parallel to the propagation direction. The residual birefringence between the waves TE and TM is extremely low, of the order of $10^{-5}$, and coupling between these two modes is then possible without periodic interaction. It is known that the refraction index of a crystal is described by an ellipsoid of the indices comprising two main axes orthogonal with each other: y and x as illustrated in FIG. 3.

Coupling between modes may be effected by means of a non diagonal electro-optical coefficient of the crystal of the substrate: $r_{61}$. By convention $r_{61}$ is the abbreviated notation of the coefficient $r_{xy,x}$; x being the direction of the field applied and xy the plane perpendicular to the propagation direction.

In the example illustrated, x is parallel to the axis X and the plane xy is parallel to the plane XY.

The application of an electric field $\vec{\epsilon_x}$ parallel to the axis x creates a rotation of $(\pi/4)$ radians of the axes of the ellipsoid of the indices with respect to the axes x and y which become x' and y'.

The orientation of the substrate with respect to the original axes of the ellipsoid of the indices is of no consequence provided that the electrodes allow the application of an electric field along the axis x.

Since a periodic interaction is no longer required, very simple electrodes may be used such as homogeneous electrodes for example. They may be, as illustrated in FIG. 2, simple rectangular plates $E_1$ and $E_2$ whose largest dimensions are parallel to the axis $\Delta$. The manufacturing precision requirements are therefore also very much attenuated.

In addition, the optical pass band is now very wide since the dispersive network is no longer present in the structure.

The materials used for substrate 1, the integrated wave guide 2 and the electrodes are naturally of the same kind as those used in the prior art.

Only the configuration of the electrodes, greatly simplified in this variant, and the orientation of the crystal change.

The manufacturing techniques are of course also the same.

By way of example, devices in accordance with the invention have been constructed in the laboratory. In this experiment, the substrate used was orientated with the axes X and C in its plane. The wave guides were formed by diffusing titanium in a lithium niobate substrate and were aligned, by masking, with the optical axis C. The diffusion conditions were the following: width of the initial titanium band 3.5 micrometers, thickness: 500 Å, diffusion time: 8 hours, temperature: 1050° C. Continuous electrodes 10 mm in length and spaced apart by 7 micrometers were then formed on each side of the wave guide. After coupling of a polarized wave in the guide, it was found that a 95% conversion in the other mode was obtained with a voltage of 18 volts applied between the electrodes.

As light source, a semi conducting diode was used of the so called "super light-emitting" type which has a relatively wide emission spectrum, of the order of 270 Å centered on a wave length of 830 mm. No variation of conversion efficiency was discovered over the width of the spectrum.

In the place of lithium niobate, which is one of the most widely used materials for integrated optics applications, any other material with electro-optical effects may of course be used, for example gallium arsenide or lithium tantalate, as was mentioned above.

For the electrodes, the metals usually used, gold, aluminimum, are perfectly suitable within the scope of the invention.

These electrodes may be deposited by all the generally used techniques and their thickness is typically of the order of 0.2 micrometer.

The invention is not limited to the electric transverse and magnetic transverse propagation modes alone. It is sufficient that at least two distinct modes may propagate in the guide structure.

In another advantageous aspect of the invention, by giving up a part of the advantages concerning the simplicity of construction of the electrodes, devices may be formed whose optical pass band is simply adjustable, in a predetermined way, between two end values: a first maximum value which is the one obtained in the case of the device of the invention in the variant which has just been described and a second minimum value which is that provided by the prior art devices. For that, it is sufficient to use substrates such that the optical axis C forms an angle $\theta$ with respect to the plane of the substrate, different from zero and from $(\pi/2)$ radians, which allows the birefringence $\Delta_{M1/M2}$ between the modes to be determined beforehand. In this case, the two end values are obtained respectively when the axis C is parallel on the one hand, and perpendicular, on the other, to the plane of the substrate.

FIG. 4 illustrates schematically a device of this type. As for the prior art devices, recourse may again be had to a dispersive electrode structure. The different elements of the device are similar to those of the device of FIG. 1, bear the same references and will not be described again. The voltage sources have not been shown in FIG. 4.

Only the orientation of the plane of substrate 1 with respect to axis C is different from a prior art device and allows the a prioriadjustment of the optical pass band according to one of the advantageous aspects of the invention.

The device of the invention is susceptible of numerous applications. The use of integrated optics polarizers may thus allow extremely simple modulators to be formed. In addition, with the possibility of choosing the birefringence of the guides, the device may be adapted to the use envisaged: filters, frequency changers, predetermined optical band polarization controllers.

What is claimed is:

1. An integrated optics polarization conversion device comprising a flat substrate made from a uniaxial crystalline material having electro-optical properties and a guide structure with given optical axis formed by doping the material of the substrate and in which at least two separate modes may propagate, wherein said crystalline material has an optical axis contained in a plane perpendicular to the substrate and parallel to the axis of one guide, and forming an angle with the plane of the substrate less than $(\pi/2)$ radians.

2. The device as claimed in claim 1, wherein the optical axis of the crystalline material is parallel to the optical axis of the guide structure.

3. The device as claimed in claim 2, further comprising a set of two electrodes made from an electrically conducting material of rectangular shape, disposed on the surface of the substrate, symmetrically on each side of said guide structure and whose large dimensions are parallel to the optical axis of said guide structure.

4. The device as claimed in claim 1, wherein the optical axis of said crystalline material forms an angle with the plane of the substrate greater than zero radian and further comprising a set of electrical pairs made from an electrically conducting material, in number at least equal to a given number n, disposed along said guide structure, the electrodes of each pair being further disposed symmetrically on each side of said guide structure and the electrode pairs being separated from each other by a length d obeying the relationship $d=\lambda(n-1)$; in which $\lambda=2\pi/(\beta_{M1}-\beta_{M2})$; $\beta_{M1}$ and $\beta_{M2}$ being the propagation constants associated with the two modes guided by said guide structure.

5. The device as claimed in claim 4, wherein the electrodes of each of said pairs are formed of metal layers inscribed in a rectangle, whose largest dimensions are orthogonal to the optical axis of the guide structure and one of the ends of which overlaps the region in which the guide is formed.

6. The device as claimed in claim 1, wherein the substrate is made from lithium nioabate and the guide structure is formed by diffusion of titanium in the substrate.

* * * * *